Sept. 24, 1957     R. I. WILSON     2,807,159

GAS ANALYSIS CELL

Filed Sept. 15, 1953

INVENTOR.
RAY I. WILSON
BY HIS ATTORNEYS.
HARRIS, KIECH, FOSTER & HARRIS

United States Patent Office 2,807,159
Patented Sept. 24, 1957

2,807,159
GAS ANALYSIS CELL

Ray I. Wilson, El Monte, Calif., assignor to Arnold O. Beckman, Inc., South Pasadena, Calif., a corporation of California Application September 15, 1953, Serial No. 380,303

8 Claims. (Cl. 73—27)

The present invention relates to a new and improved type of gas analysis cell.

Comparatively recently, several procedures have come into prominence for the analysis of gas mixtures in which a quantity of gas is segregated within a measuring tube where it is exposed to heat generated by two electrical resistance elements. In order that satisfactory results can be obtained with such processes, there must be substantially no pressure difference across the measuring tube due to any factors except as are related to the action of the resistance elements. This limitation is extremely important from a practical point of view, since any continuous apparatus containing a measuring tube of the type specified must be very carefully constructed in order that no undesired flow currents are present within this tube.

As an example of this, in the measurement of the magnetic properties of a fluid by means of the magnetic wind principle, it is customary to use annular chambers containing diametrically opposed outlets and inlets which chambers are divided by measuring tubes which are placed midway between the inlets and the outlets, at an angle of 90° to a line drawn therebetween. Any deviation from this symmetrical construction results in a pressure difference tending to cause undesired flow through the measuring tubes. Inasmuch as the amount of this undesired flow varies with the total quantity of gas traversing the apparatus, it causes a variation in the temperatures of the two resistance elements, for which it is extremely difficult to compensate.

The same difficulty in compensation is encountered when undesired gas flow is present in a measuring tube employed in the determination of the convection coefficient of a gas mixture. Since such a process utilizes the movement of gas caused by heating, the presence of any unknown gas currents effectively prevents this process from being carried out.

It is an object of the present invention to produce a new and improved type of analysis cell which can be used conveniently and effectively for either magnetic or thermal convection measurements as indicated above. A further object of the invention is to produce a device of the class described which can be easily and conveniently constructed and which, because of its simplicity, is relatively foolproof in operation. Further objects of the invention will be apparent from the balance of the specification, the appended claims and the accompanying drawings, in which:

Briefly, the above and related aims are achieved by forming a device of the class described in which an inlet and an outlet to a segregated measuring tube are positioned adjacent to one another upon opposite sides of a gas flow channel and in which this measuring tube is heated by two electrical heating elements, placed one following the other, both of the elements being connected at approximately the center of this tube by a common lead which, together with the leads from both ends of these heating elements, is connected to a common Wheatstone bridge type of measuring apparatus. Perhaps this construction will be best apparent with reference to the drawings.

Figure 1:
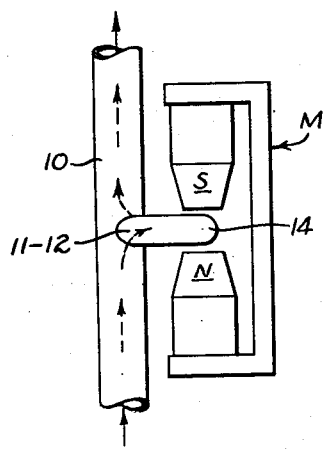
Fig. 1 illustrates a side view of a gas analysis apparatus of the present invention.
Figure 2:
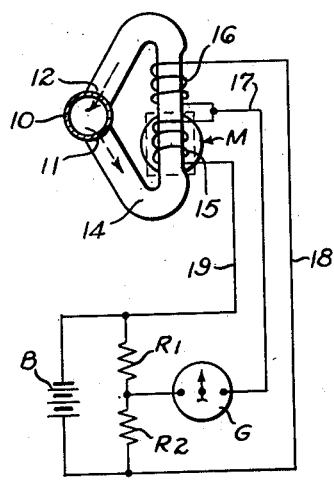
Fig. 2 shows a top view of this apparatus.

In Figs. 1 and 2, a device of the invention is shown as consisting essentially of flow channel 10 through which the fluid to be analyzed is continuously passed during the analysis. Adjacent to one another within the midsection of this channel 10, are an inlet 11 and an outlet 12 in fluid communication with the channel 10 positioned within the same plane perpendicular to this channel. Both the inlet 11 and the outlet 12 connect to a triangular external tube 14 within this same plane. The base of this triangular measuring tube 14 is provided externally with two adjacent resistance windings 15 and 16, respectively, connected at their juncture by means of a common lead 17 and at their ends by terminal leads 19 and 18. As is shown in Fig. 2 of the drawings, the lead 17 is connected through a galvanometer G to the midpoint between two resistors, $R_1$ and $R_2$, the terminal portions of which are respectively connected to the leads 19 and 18 respectively. These terminal portions are also connected to a battery B. Other sources of constant voltage or current may, however, be used in place of this battery, as is known in the art.

When the device shown in the initial figures of the drawing is to be used for the measurements relating to paramagnetic content of gas mixtures, a magnet M having poles N and S is disposed as shown in Figs. 1 and 2 of the drawings so that the poles N and S set up a high intensity magnetic field within the area traversed by the heating element 15, although this field may be alternatively concentrated within the area traversed by the heating element 16. When used for magnetic measurements, the measuring tube 14 must be disposed parallel to the earth's surface.

In use for this purpose, a gas mixture containing a paramagnetic component to be analyzed is caused to flow through the channel 10, and enters the measuring tube 14 by diffusion or by thermally induced flow. Within the measuring tube 14, the gas is heated by the heating elements 15 and 16 through power supplied by the battery B. As the paramagnetic component is heated, its magnetic susceptibility decreases and it is replaced by relatively cooler gas coming through the inlet 11 into the tube 14 displacing it toward the heating element 16. The differential in temperature between these two heating elements is measured by means of the galvanometer G and reflects the paramagnetic gas content of the gas mixture flowing through the flow tube 10. If desired, this galvanometer G can be calibrated to read the paramagnetic gas composition directly.

When the device shown in Figs. 1 and 2 is to be used in a system based on convection flow, the measuring tube 14 must be disposed at right angles to the earth's surface. No magnet is used for carrying out this process. During it, gas entering the tube 14 will be heated by the lower of the two electrical heating elements 15 and 16, and because of this, heated gas will rise past the second of these elements. The difference in their temperatures will be reflected in the reading of the galvanometer G, which if desired, can be calibrated to read the convection coefficient, or gas composition, directly.

The configuration of Figs. 1 and 2 has several distinct practical advantages. By virtue of the fact that the inlet 11 and the outlet 12 to the measuring tube 14 are positioned closely adjacent to one another in the same plane perpendicular to the axis of the channel 10, no pressure due to flow through this channel exerts itself upon the contents of the measuring tube 14. Further, the device can be designed to handle a wide variety of flow rates since the main flow channel 10 does not have to conform to any special shape, such as for example, an annular configuration. Because of the reduced sensitivity to flow, ordinary fabrication techniques, such as for example, common glass blowing procedures, can be employed in manufacturing devices as illustrated.

Figure 3:
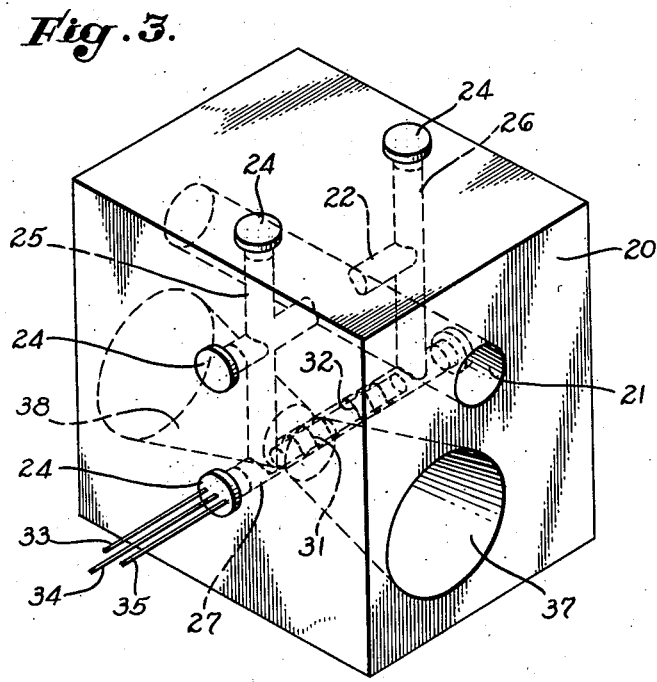
Fig. 3 shows an isometric view of a modified apparatus falling within the scope of the present invention.

The modified construction illustrated in Fig. 3 of the drawings is in many respects similar to the construction shown in the initial figures. However, here the device of the invention is illustrated as composed of a block 20 which is preferably composed of a nonmagnetic electrically and thermally nonconductive material such as, for example, an inert resinous material such as polytetrafluoroethylene, phenol-formaldehyde resin, or the like, and through which there traverses a gas flow channel 21 which may be provided with terminal tapped apertures (not shown), if desired. Midway within the block 20 there is provided a flow tube 22 traversing the channel 21 at right angles to it, and preferably intersecting the axis of the channel. This flow tube 22 is traversed by two tubes 25 and 26 positioned at right angles to it and terminating in a fourth tube 27 positioned parallel to the tube 22. All four of these tubes 22, 25, 26 and 27 are plugged by plugs 24 so as not to be in communication with the outside of the device 20. Within the tube 27, there is positioned a resistance cylinder consisting of first and second resistance windings 31 and 32, connected in series with one another, and connected externally of the device by leads 33, 34 and 35. These leads respectively connect to one end of the winding 31, to the junction between the windings 31 and 32, and to the other end of the winding 32 and are inserted in a Wheatstone bridge type of apparatus such as is diagrammatically illustrated in conjunction with Fig. 2.

When the device shown is to be used for the magnetic analysis of gas mixtures, recessed openings 37 and 38 are provided within the block 20 leading immediately adjacent to one of the windings 31 or 32, as indicated. These recessed openings are designed in such a manner that magnetic pole shoes may be positioned within them.

The construction illustrated in Fig. 3 is used in substantially the same manner indicated above and has several distinct advantages over and above the fact that all of the fluid passages shown can be easily and conveniently manufactured by simple drilling techniques. The electrical heating elements used within this modification of the invention can be inserted into the passage 27 from outside of the device with great ease following the formation of this passage. This permits the use of subassembly techniques. Further, it allows the interchange of one heating element for another depending upon the specific gas mixture being analyzed. Thus, for example, heating elements having different temperature coefficients of resistance can be used with the device illustrated for different purposes, as with gases of different composition ranges. This is particularly important when it is desired to use various temperature-sensitive semiconductive materials such as thermistors as the heating elements.

Those skilled in the art will realize that a number of modifications may be made within the scope of this disclosure. Thus, for example, cylindrical coatings of resistance materials disposed either internally or externally of the measuring tube discussed can be employed instead of the resistance windings discussed. Also, heated rods or the like can be used to replace these resistance windings. Modifications of this type are to be considered as part of this invention insofar as they are defined by the appended claims.

I claim as my invention:

1. A new and improved gas analysis cell, which comprises: means defining a single gas flow channel; separate inlet and outlet means in fluid communication with said channel and positioned within a single plane at right angles to the axis of said channel; a single analysis tube means in fluid communication with said inlet and outlet means; and means for applying a force to the gas in said analysis tube, said force being directed along said analysis tube producing flow of gas from said flow channel into said inlet means, through said analysis tube and then through said outlet means to said flow channel; two temperature sensitive electrical heating elements disposed so as to affect the temperature of the contents of said analysis tube means.

2. A device as defined in claim 1, wherein said electrical heating elements are disposed externally of said analysis tube means.

3. A device as defined in claim 1, wherein said electrical heating elements are disposed internally of said analysis tube means.

4. In a gas analysis cell, the combination of: means defining a single gas flow channel; an inlet tube in fluid communication with said channel; an outlet tube in fluid communication with said channel; a single analysis tube in fluid communication with said inlet and outlet tubes, said inlet tube, said analysis tube and said outlet tube defining a continuous gas flow path lying in a plane perpendicular to the axis of said channel; a first temperature sensitive electrical heating element disposed so as to affect the temperature of the contents of said analysis tube at a first zone; a second temperature sensitive electrical heating element disposed so as to affect the temperature of the contents of said analysis tube at a second zone, said first zone and said second zone being adjacent each other along said continuous flow path; and means for applying a force to the gas in said analysis tube, said force being directed along said analysis tube producing flow of gas from said flow channel into said inlet tube, through said analysis tube and then through said outlet tube to said flow channel.

5. A device as defined in claim 4, wherein said inlet tube, said outlet tube, and said analysis tube are disposed in a substantially triangular configuration with respect to one another.

6. A device as defined in claim 4, wherein said inlet tube and said outlet tube are parallel to said analysis tube, and wherein tubular means are provided to connect said tubes.

7. A device as defined in claim 4, wherein said channel and tubes are formed within a unitary block of material.

8. In a gas analysis cell, the combination of: means defining a single gas flow channel; an inlet tube in fluid communication with said channel; an outlet tube in fluid communication with said channel; a single analysis tube in fluid communication with said inlet and outlet tubes, said inlet tube, said analysis tube and said outlet tube defining a continuous gas flow path lying in a plane perpendicular to the axis of said channel; a first temperature sensitive electrical heating element disposed so as to affect the temperature of the contents of said analysis tube at a first zone; a second temperature sensitive electrical heating element disposed so as to affect the temperature of the contents of said analysis tube at a second zone, said first zone and said second zone being adjacent each other along said continuous flow path; and means for establishing a magnetic field within said first zone.

References Cited in the file of this patent

UNITED STATES PATENTS

| | | |
|---|---|---|
| 2,269,850 | Hebler | Jan. 13, 1942 |
| 2,591,762 | Ziakowsky | Apr. 8, 1952 |
| 2,585,959 | Minter | Feb. 19, 1952 |
| 2,603,965 | Medlock | July 22, 1952 |